US011106222B2

(12) United States Patent
Zhang et al.

(10) Patent No.: US 11,106,222 B2
(45) Date of Patent: Aug. 31, 2021

(54) METHOD FOR DETECTING POSITIONING APPARATUS OF UNMANNED AERIAL VEHICLE, AND UNMANNED AERIAL VEHICLE

(71) Applicant: SZ DJI TECHNOLOGY CO., LTD., Shenzhen (CN)

(72) Inventors: Zhipeng Zhang, Shenzhen (CN); Naibo Wang, Shenzhen (CN); Ning Ma, Shenzhen (CN); Xiaojun Yin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/713,621

(22) Filed: Dec. 13, 2019

(65) Prior Publication Data

US 2020/0247554 A1 Aug. 6, 2020

Related U.S. Application Data

(63) Continuation of application No. PCT/CN2017/090698, filed on Jun. 29, 2017.

(51) Int. Cl.
*H04W 12/08* (2021.01)
*G05D 1/10* (2006.01)
*B64D 45/00* (2006.01)
*B64C 19/02* (2006.01)

(52) U.S. Cl.
CPC ............ *G05D 1/101* (2013.01); *B64C 19/02* (2013.01); *B64D 45/0031* (2019.08); *G05D 1/104* (2013.01); *B64C 2201/145* (2013.01)

(58) Field of Classification Search
CPC .................................................... H04W 12/08
See application file for complete search history.

(56) References Cited

U.S. PATENT DOCUMENTS

| | | | | |
|---|---|---|---|---|
| 7,969,346 | B2 * | 6/2011 | Franceschini | G01S 13/782 342/30 |
| 9,735,856 | B2 * | 8/2017 | Cain | H04B 7/18506 |
| 10,424,206 | B2 * | 9/2019 | Shenfeld | G08G 5/045 |

(Continued)

FOREIGN PATENT DOCUMENTS

| | | |
|---|---|---|
| CN | 102187246 A | 9/2011 |
| CN | 105022401 A | 11/2015 |

(Continued)

OTHER PUBLICATIONS

The World Intellectual Property Organization (WIPO) International Search Report for PCT/CN2017/090698 dated Mar. 27, 2018 7 pages.

*Primary Examiner* — K. Wong
(74) *Attorney, Agent, or Firm* — Anova Law Group, PLLC

(57) ABSTRACT

A control terminal includes a memory storing program instructions, a communication interface configured to communicate with an unmanned aerial vehicle (UAV), receive position information outputted by a positioning device of the UAV and sent by the UAV, and receive flight state information of a plurality of aircrafts detected by an aircraft detection device of the UAV and sent by the UAV, and a processor configured to execute the program instructions to detect an operation state of the positioning device based on the position information and the flight state information.

17 Claims, 8 Drawing Sheets

Obtaining position information outputted by a positioning device of a UAV — S101

Obtaining flight state information of a plurality of aircrafts detected by an aircraft detection device of the UAV — S102

Based on position information and the flight state information, detecting an operating state of the positioning device — S103

Receiving position information outputted by a positioning device of a UAV and sent from the UAV — S901

Receiving the flight state information of a plurality of aircrafts detected by an aircraft detection device of the UAV and sent by the UAV — S902

Based on the flight state information, determining a position range of the UAV — S903

Based on the position range and the position information of the UAV, detecting whether the positioning device has been cracked or interfered with — S904

When it is detected that the positioning device has been cracked or interfered with, performing a pre-set operation — S905

(56) References Cited

U.S. PATENT DOCUMENTS

| | | | | |
|---|---|---|---|---|
| 10,450,064 | B2 * | 10/2019 | Vaughn | G08G 5/0056 |
| 10,586,464 | B2 * | 3/2020 | Dupray | H04B 7/18504 |
| 10,783,251 | B2 * | 9/2020 | Martinez | G08G 5/003 |
| 10,791,173 | B2 * | 9/2020 | Natanzon | H04L 9/3297 |
| 2007/0129879 | A1 | 6/2007 | Fedora | |
| 2011/0099421 | A1 * | 4/2011 | Geist | G06F 11/10 714/10 |
| 2019/0172359 | A1 * | 6/2019 | Argo | G08G 5/0034 |
| 2020/0105151 | A1 * | 4/2020 | Mahkonen | H04W 4/06 |
| 2020/0400838 | A1 * | 12/2020 | Agee | G01S 19/215 |
| 2020/0402193 | A1 * | 12/2020 | Schuler | G06Q 50/265 |

FOREIGN PATENT DOCUMENTS

| | | | |
|---|---|---|---|
| CN | 105445729 | A | 3/2016 |
| CN | 106886032 | A | 6/2017 |
| CN | 206235739 | U | 6/2017 |

* cited by examiner

METHOD FOR DETECTING POSITIONING APPARATUS OF UNMANNED AERIAL VEHICLE, AND UNMANNED AERIAL VEHICLE

CROSS-REFERENCE TO RELATED APPLICATION

This application is a continuation of International Application No. PCT/CN2017/090698, filed on Jun. 29, 2017, the entire content of which is incorporated herein by reference.

TECHNICAL FIELD

The present disclosure relates to the field of control technology and, more particularly, to a method for detecting an operation state of a positioning device (positioning apparatus) of an unmanned aerial vehicle (UAV) and an unmanned aerial vehicle.

BACKGROUND

To ensure flight safety, flight restriction zones are often set up in airports, downtown areas, and military administrative areas, etc. An unmanned aerial vehicle (UAV) determines its position by a positioning device and decides whether take-off is permitted and a permitted flight height after the take-off, thereby preventing the UAV from flying within the flight restriction zones. However, to break restrictions, some UAV users may crack/hack or interfere with the position devices to make the positioning devices output fake positions outside the flight restriction zones, such that the UAVs may be permitted to fly freely within the flight restriction zones and may inadvertently cause flight accidents.

SUMMARY

In accordance with the disclosure, there is provided a control terminal including a memory storing program instructions, a communication interface configured to communicate with an unmanned aerial vehicle (UAV), receive position information outputted by a positioning device of the UAV and sent by the UAV, and receive flight state information of a plurality of aircrafts detected by an aircraft detection device of the UAV and sent by the UAV, and a processor configured to execute the program instructions to detect an operation state of the positioning device based on the position information and the flight state information.

Also in accordance with the disclosure, there is provided an unmanned aerial vehicle (UAV) including a memory storing program instructions and a processor configured to execute the program instructions to obtain position information outputted by a positioning device of the UAV, obtain flight state information of a plurality of aircrafts detected by an aircraft detection device of the UAV, and detect an operation state of the positioning device based on the position information and the flight state information.

Also in accordance with the disclosure, there is provided a method including obtaining position information outputted by a positioning device of an unmanned aerial vehicle (UAV), obtaining flight state information of a plurality of aircrafts detected by an aircraft detection device of the UAV, and detecting an operation state of the positioning device based on the position information and the flight state information.

BRIEF DESCRIPTION OF THE DRAWINGS

To more clearly illustrate the technical solution in the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed by the present disclosure.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

A method for detecting an operation state of a positioning device of a UAV (method for detecting the positioning device of the UAV) is described in detail below with reference to the drawings. The features described in the embodiments of the present disclosure may be combined with each other under a no-conflict condition.

Figure 1:
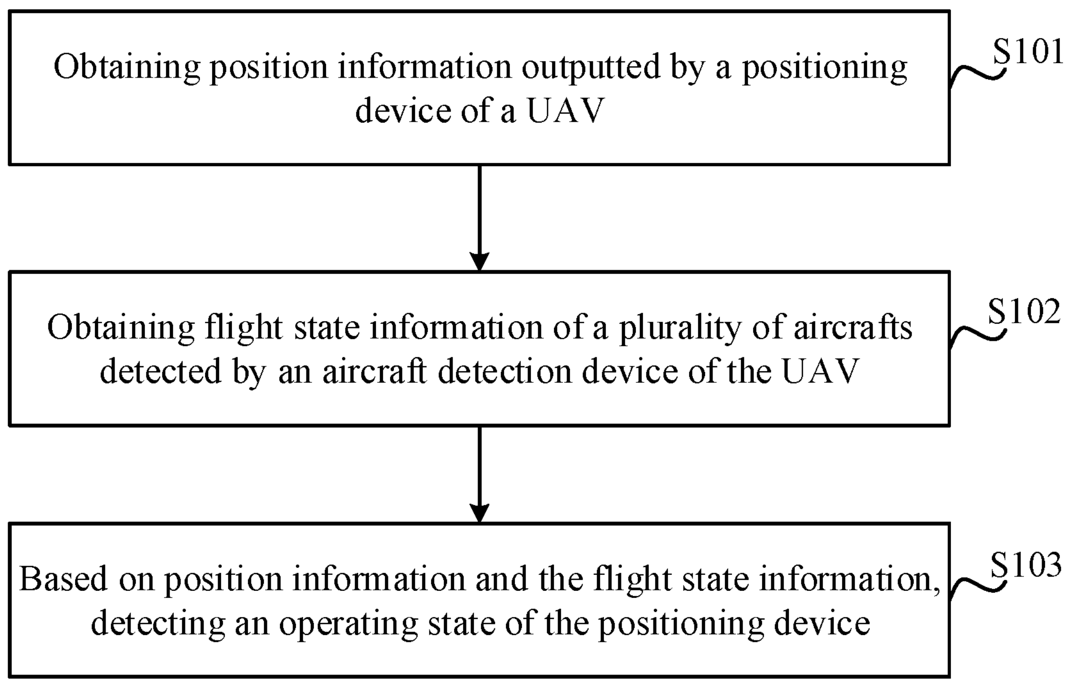
FIG. 1 is a flowchart of a method for detecting an operation state of a positioning device of a UAV according to an example embodiment of the present disclosure.

The present disclosure provides the method for detecting the positioning device of the UAV. FIG. 1 is a flowchart of a method for detecting an operation state of a positioning device of a UAV according to an example embodiment of the present disclosure. The method may be applied to the UAV. As shown in FIG. 1, the method includes the following.

At S101, position information outputted by a positioning device of a UAV is obtained.

Specifically, the UAV includes the positioning device. The positioning device may obtain the position information at a pre-set interval and send the obtained position information to a processor of the UAV. The positioning device may be one or more of a Global Navigation Satellite System (GNSS) receiver, a Global Positioning System (GPS) receiver, a BeiDou Navigation Satellite System (BNSS) receiver, a Galileo Satellite Navigation System (GSNS) receiver, and a Global Navigation Satellite System (GLONASS) receiver. Under normal circumstances, the positioning device is equipped on the UAV to provide accurate position information for the UAV. Under certain circumstances, the positioning device may also include a measurement unit, a visual sensor, and/or a radar, etc.

The position information may include latitude information, longitude information, and/or altitude information of the UAV.

At S102, flight state information of a plurality of aircrafts/aerial crafts detected by an aircraft/aerial-craft detection device of the UAV is obtained.

Specifically, each aircraft is equipped with a flight state information broadcast device for broadcasting aircraft state information. The device may broadcast the flight state information of the aircraft at a pre-set interval. The UAV is equipped with the aircraft detection device. The aircraft detection device may receive the flight state information (broadcasted by the flight state information broadcast device equipped on the aircraft) broadcasted by the aircrafts surrounding the UAV. Under certain circumstances, the UAV may also broadcast the flight state information thereof through the aircraft detection device. For example, the flight state information broadcast device and the aircraft detection device may include an Automatic Dependent Surveillance-Broadcast (ADS-B) device. The flight state information may include one or more of position information, altitude information, speed information, flight route information, and flight identifier of the aircraft.

At S103, an operation state of the positioning device is detected based on the position information and the flight state information.

Specifically, detecting the operation state of the positioning device of the UAV based on the position information and the flight state information from a plurality of aircrafts includes the following process. The position information and the flight state information from the plurality of aircrafts are used to detect whether the positioning device of the UAV has been cracked or interfered with. If the positioning device is cracked or interfered with, the position information outputted by the positioning device is not a true position where the UAV is currently located. When the position information outputted by the positioning device is determined, based on the flight state information, to not represent the true position of the UAV, the operation state of the positioning device is determined to be abnormal. Specifically, this means that the positioning device has been cracked or interfered with.

An order of executing S101 and S102 is not specifically limited herein, and S101 and S102 may be performed sequentially or concurrently.

In the embodiments of the present disclosure, the position information outputted by the positioning device is obtained. Then, the flight state information of the plurality of aircrafts surrounding the UAV is obtained. The position information of the flight state information from the plurality of aircrafts are used to detect the operation state of the positioning device. As such, the flight state information from the plurality of aircrafts detected by the aircraft detection device and the position information outputted by the positioning device are used to determine whether the positioning device of the UAV has been cracked or interfered with. If the positioning device has not been cracked or interfered with, the position information outputted by the positioning device may be used to determine the flight state of the UAV. For example, the UAV may fly below a speed limit under a certain altitude within the flight restriction zones and may fly freely outside the flight restriction zones. If the positioning device has been cracked or interfered with, because the position information outputted by the positioning device cannot be trusted, the flight state of the UAV needs to be controlled to avoid entering the flight restriction zones. In the present disclosure, the operation state of the positioning device is used to adjust the flight state of the UAV, thereby ensuring the flight safety of the UAV and the surrounding aircrafts.

Figure 2:
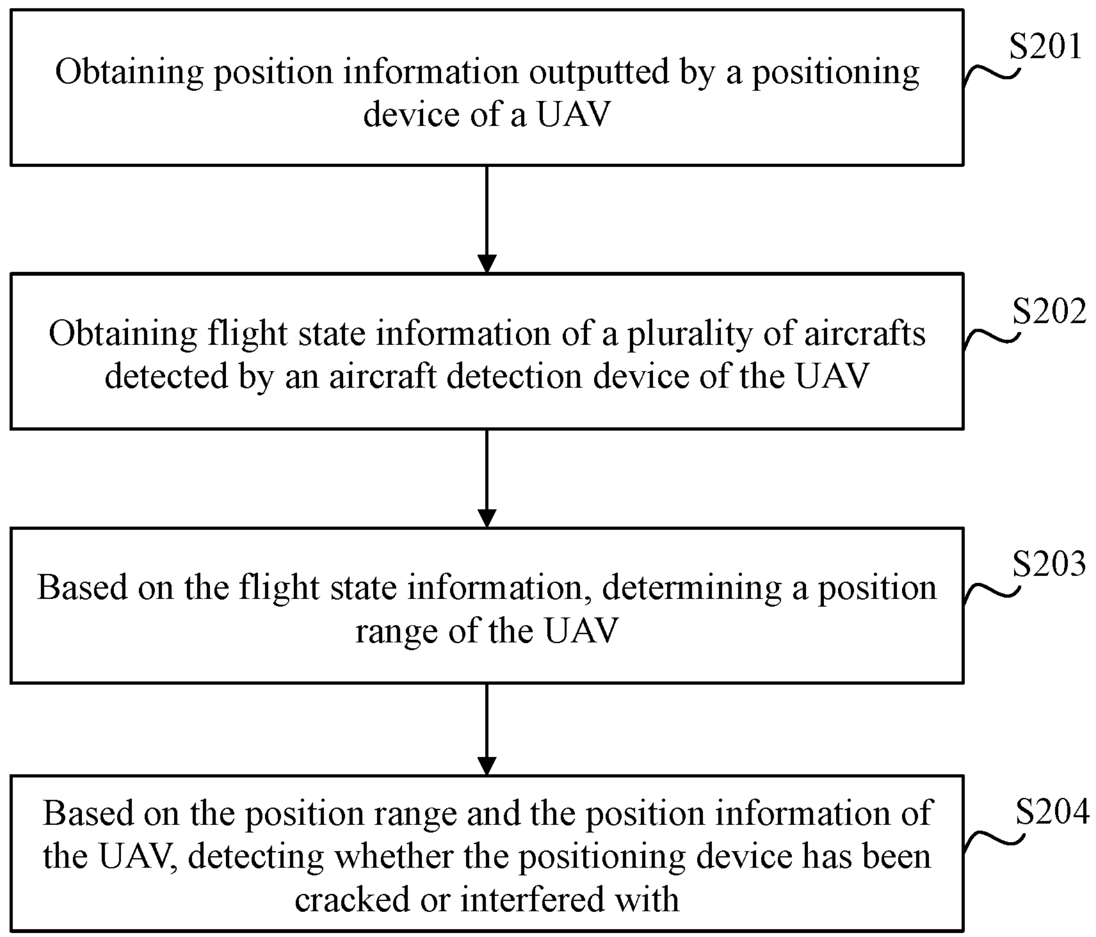
FIG. 2 is a flowchart of a method for detecting an operation state of a positioning device of the UAV according to another example embodiment of the present disclosure.
Figure 3:
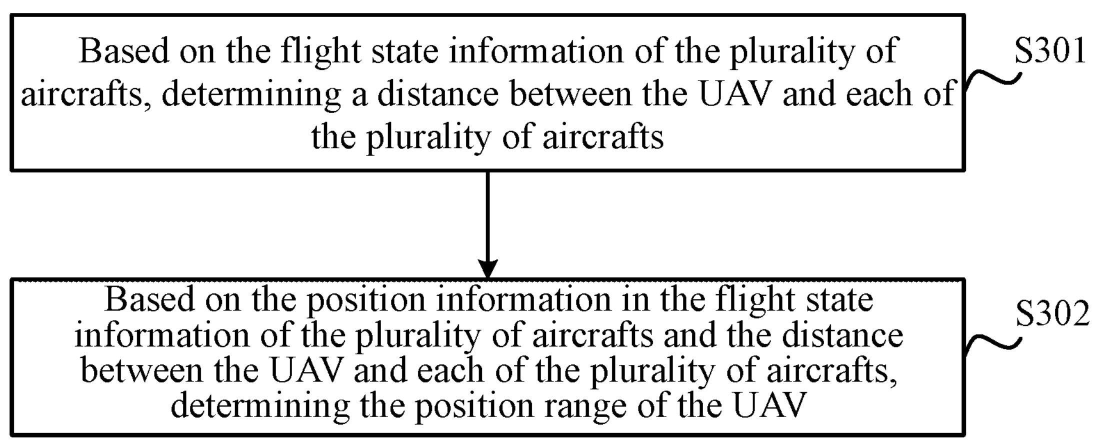
FIG. 3 is a flowchart of determining position information of the UAV based on flight state information according to an example embodiment of the present disclosure.

FIG. 2 is a flowchart of a method for detecting an operation state of a positioning device of the UAV according to another example embodiment of the present disclosure. The method shown in FIG. 2 includes the following.

At S201, position information outputted by a positioning device of a UAV.

S201 and S101 share same or similar operation principle. For detailed description of S201, reference may be made to the same for S101 in FIG. 1, and hence details thereof will not be described again.

At S202, flight state information of a plurality of aircrafts detected by an aircraft detection device of the UAV.

S202 and S102 share same or similar operation principle. For detailed description of S202, reference may be made to the same for S102 in FIG. 1, and hence details thereof will not be described again.

At S203, a position range of teh UAV is determined based on the flight state information.

Specifically, after the flight state information of the plurality pf aircrafts is obtained, the position range of the UAV may be determined based on the flight state information. That is, the flight state information is used to determine an approximate range of locations that the UAV may be at. In some embodiments, determining the position range of the UAV based on the flight state information includes the following process.

At S301, a distance between the UAV and each of the plurality of aircrafts is determined based on the flight state information of the plurality of aircrafts.

At S302, the position range of the UAV is determined based on the position information in the flight state information of the plurality of aircrafts and the distance between the UAV and each of the plurality of aircrafts.

In some embodiments, determining the distance between the UAV and each of the plurality of aircrafts based on the flight state information of the plurality of aircrafts (S301) may be implemented in one of the following manners.

In one embodiment, a receiving signal strength of the flight state information of each of the plurality of aircrafts is used to determine the distance between the UAV and each of the plurality of aircrafts. Specifically, the aircraft detection device of the UAV receives the flight state information. After the flight state information is received, the UAV may detect the receiving signal strength of the flight state information, that is, determine the receiving signal strength of the flight state information of each of the plurality of aircrafts. Then, the distance between the UAV and each of the plurality of aircrafts is calculated according to a mathematical function between the receiving signal strength and the distance.

The mathematical function may be pre-configured in the UAV. The mathematical function may be obtained by collecting massive amount of experimental data and may be stored in a tabular form in the UAV.

In another embodiment, a quantity of the flight state information (e.g., the number of pieces of flight state information) of each of the plurality of aircrafts detected by the aircraft detection device within a pre-set time interval is determined. Based on the quantity of the flight state information of each of the plurality of aircrafts, the distance between the UAV and each of the plurality of aircrafts is determined. Specifically, the quantity of the flight state information of each of the plurality of aircrafts received by the aircraft detection device within the pre-set time interval is determined. Because the distance between the UAV and each of the plurality of aircrafts varies, the aircraft detection device of the UAV may receive different quantities of the flight state information for each of the plurality of aircrafts. That is, the distance between the UAV and each of the plurality of aircrafts and the quantity of the flight state information of each of the plurality of aircrafts that the aircraft detection device can receive are strongly correlated. Within the pre-set time interval, the greater the quantity of the received flight state information, the shorter the distance between the UAV and the corresponding aircraft. That is, the distance between the UAV and each of the plurality of aircrafts may be determined based on the quantity of the flight state information of each of the plurality of aircrafts received by the aircraft detection device within the pre-set time interval.

In some embodiments, determining the distance between the UAV and each of the plurality of aircrafts based on the flight state information of the plurality of aircrafts (S301) also includes the following process. Based on the quantity data of the flight state information of each of the plurality of aircrafts and a broadcast frequency of the flight state information broadcasted by a broadcast device of the corresponding aircraft, the distance between the UAV and each of the plurality of aircrafts is determined. Specifically, for each of the plurality of aircrafts, the quantity of the flight state information received by the aircraft detection device of the UAV within the pre-set time interval is collected. The quantity of the flight state information of each of the plurality of aircrafts received by the aircraft detection device of the UAV within a unit time is determined. The broadcast frequency of the flight state information broadcasted by the broadcast device of each of the plurality of aircrafts may represent the quantity of the flight state information broadcasted by the broadcast device of each of the plurality of aircrafts within the unit time. The quantity of the flight state information of each of the plurality of aircrafts received by the aircraft detection device of the UAV within the unit time is compared with the quantity of the flight state information broadcasted by the broadcast device of each of the plurality of aircrafts within the unit time to determine a ratio of the quantity of the flight state information of each of the plurality of aircrafts received by the aircraft detection device of the UAV within the unit time over the quantity of the flight state information broadcasted by the broadcast device of each of the plurality of aircrafts within the unit time. The ratio is strongly correlated with the distance between the UAV and the corresponding aircraft. The greater the ratio, the shorter the distance between the UAV and the corresponding aircraft. That is, the distance between the UAV and each of the plurality of aircrafts may be determined by the corresponding ratio.

The above-described method, i.e., determining the ratio of the quantity of the flight state information of each of the plurality of aircrafts received by the aircraft detection device of the UAV within the unit time over the quantity of the flight state information broadcasted by the broadcast device of each of the plurality of aircrafts within the unit time and then determining the distance between the UAV and each of the plurality of aircrafts based on the corresponding ratio, is just one example of the implementations. Those skilled in the art may use other methods to determine the distance between the UAV and each of the plurality of aircrafts based on the quantity data of the flight state information of each of the plurality of aircrafts and the broadcast frequency of the flight state information broadcasted by the broadcast device of each of the plurality of aircrafts. Such other methods are not limited by the embodiments of the present disclosure.

In some embodiments, determining the position range of the UAV based on the position information in the flight state information of each of the plurality of aircrafts and the distance between the UAV and each of the plurality of aircrafts may include determining a plurality of zones corresponding to the plurality of aircrafts, respectively, based on the position information in the flight state information of each of the plurality of aircrafts and the distance between the UAV and each of the plurality of aircrafts, and determining an overlapping area of the zones of the plurality of aircrafts as the position range of the UAV.

Specifically, the zone corresponding to an aircraft is determined based on the position information in the flight state information of the aircraft and the distance between the UAV and the aircraft. That is, with respect to a particular aircraft, the UAV is possibly located in the zone for the particular aircraft. After the zone for each of the plurality of aircrafts is determined, the overlapping area of the zones of the plurality of aircrafts may be determined. With respect to the plurality of aircrafts at the same time, the UAV may be located in the overlapping area and the overlapping area is determined to be the position range of the UAV.

Figure 4:
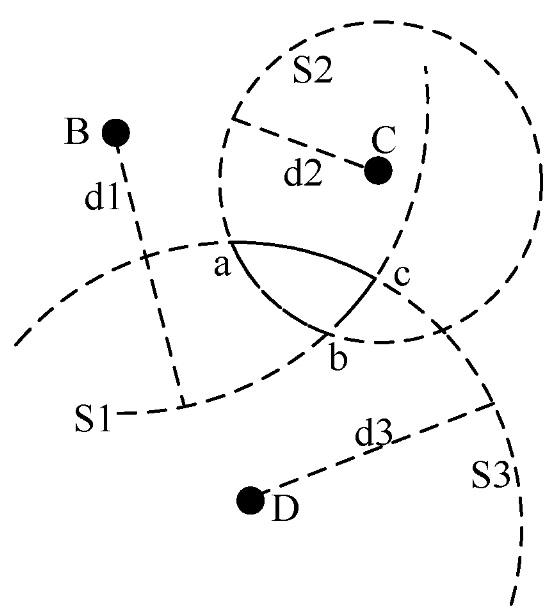
FIG. 4 is a schematic view of determining a position range of the UAV according to an example embodiment of the present disclosure.

In some embodiments, as shown in FIG. 4, determining the overlapping area may include the following process. A position indicated by the position information of an aircraft is at the center of a sphere, and the distance between the UAV and corresponding aircraft is the radius of the sphere (for the convenience of illustration, represented by a circle). For example, UAV A receives the flight state information from three aircrafts B, C, and D. Based on position information of the three aircrafts B, C, and D, and the distances d1, d2, and d3 between UAV A and three aircrafts B, C, and D, three spheres may be determined. As such, the overlapping area abc may be determined based on the three spheres. The position range of UAV A is the overlapping area abc.

The above implementation for determining the overlapping area is intended to be illustrative. Those skilled in the art may use other methods to determine the overlapping area based on the three spheres, which are not limited by the present disclosure.

At S204, whether the positioning device has been cracked or interfered with is detected based on the position range and the position information of the UAV.

Specifically, after the position range of the UAV is obtained, whether the position information outputted by the positioning device of the UAV is within the position range is determined. If the position information outputted by the positioning device of the UAV is within the position range, the positioning device can be determined to be operating normally. If the position information outputted by the positioning device of the UAV is located outside the position range, the positioning device can be determined to have been cracked or interfered with.

Figure 5:
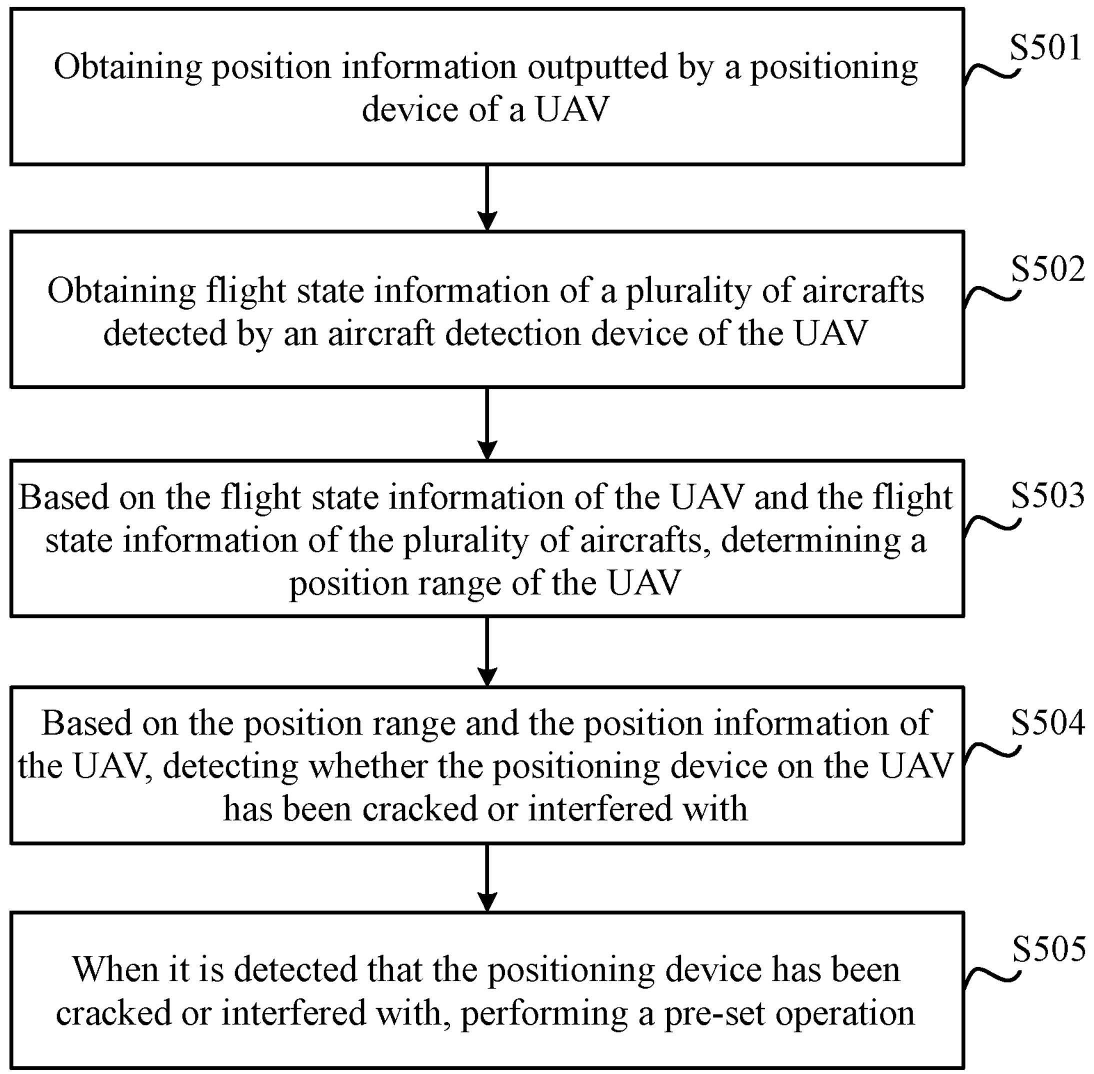
FIG. 5 is a flowchart of a method for detecting the operation state of the positioning device of the UAV according to another example embodiment of the present disclosure.

FIG. 5 is a flowchart of a method for detecting the operation state of the positioning device of the UAV according to another example embodiment of the present disclosure. The method shown in FIG. 5 includes the following.

At S501, position information outputted by a positioning device of a UAV is obtained.

S501 and S101 share same or similar operation principle. For detailed description of S501, reference may be made to the same for S101 in FIG. 1, and hence details thereof will not be described again.

At S502, flight state information of a plurality of aircrafts detected by an aircraft detection device of the UAV is obtained.

S502 and S102 share same or similar operation principle. For detailed description of S502, reference may be made to the same for S102 in FIG. 1, and hence details thereof will not be described again.

At S503, a position range of the UAV is determined based on the flight state information of the UAV and the flight state information of the plurality of aircrafts.

S503 and S203 share same or similar operation principle. For detailed description of S503, reference may be made to the same for S203 in FIG. 2, and hence details thereof will not be described again.

At S504, whether the positioning device of the UAV has been cracked or interfered with is detected based on the position range and the position information of the UAV.

S504 and S103 share same or similar operation principle. For detailed description of S504, reference may be made to the same for S103 in FIG. 1, and hence details thereof will not be described again.

At S505, a pre-set operation is performed if it is detected that the positioning device has been cracked or interfered with.

Specifically, when it is detected that the positioning device has been cracked or interfered with, the pre-set operation may be performed in one of the following manners.

In one embodiment, when it is detected that the positioning device has been cracked or interfered with, a notification message is sent to a control terminal.

In another embodiment, when it is detected that the positioning device has been cracked or interfered with, the flight of the UAV is restricted.

For example, restricting the flight of the UAV may include restricting one or more of flight time, flight distance, or flight altitude of the UAV, or may include controlling the UAV to return.

Figure 6:
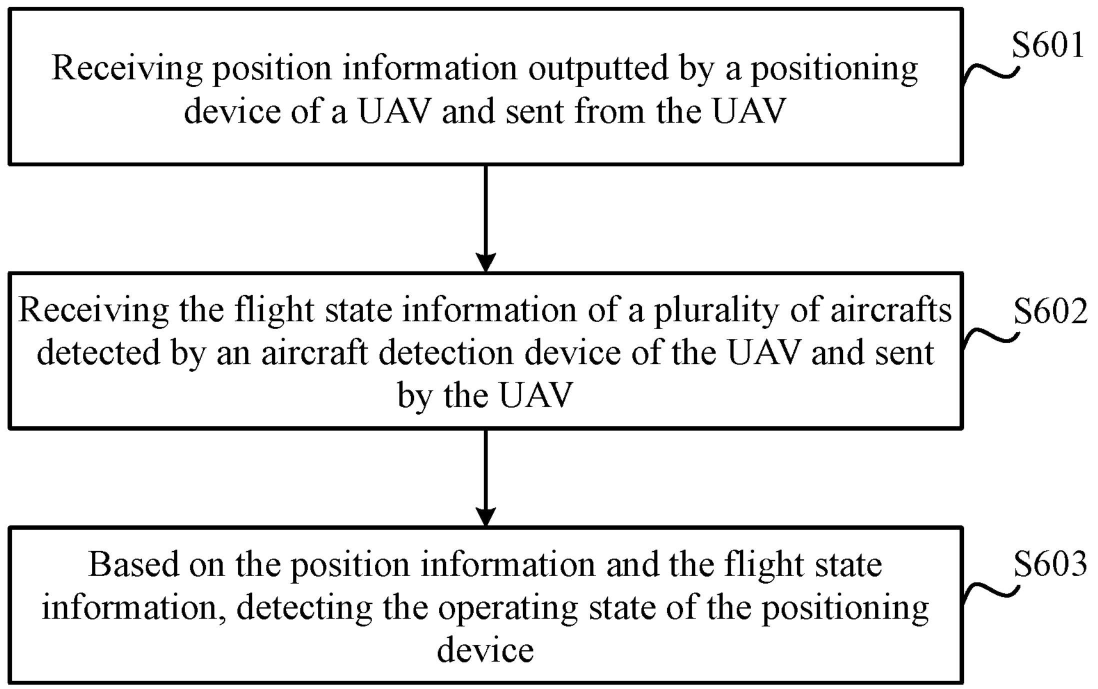
FIG. 6 is a flowchart of a method for detecting the operation state of the positioning device of the UAV according to another example embodiment of the present disclosure.

FIG. 6 is a flowchart of a method for detecting the operation state of the positioning device of the UAV according to another example embodiment of the present disclosure. The method may be applied to a control terminal of the UAV. As shown in FIG. 6, the method include the following.

At S601, position information outputted by a positioning device of a UAV and sent from the UAV is received.

Specifically, the control terminal includes one or more of a remote controller, a smart phone, a tablet computer, a laptop computer, a ground station, and a wearable device (e.g., a watch, a wristband). The UAV sends the position information outputted by the positioning device to the control terminal through a downlink data link and correspondingly, the control terminal receives the position information sent by the UAV through the downlink data link.

At S602, the flight state information of a plurality of aircrafts detected by an aircraft detection device of the UAV and sent by the UAV is received.

Specifically, the UAV sends the flight state information of the plurality of aircrafts detected by the aircraft detection device of the UAV to the control terminal through the downlink data link. Correspondingly, the control terminal receives the flight state information of the plurality of aircrafts sent by the UAV through the downlink data link.

At S603, the operation state of the positioning device is detected based on the position information and the flight state information.

Specifically, detecting the operation state of the positioning device based on the position information and the flight state information of the plurality of aircrafts includes: detecting whether the positioning device of the UAV has been cracked or interfered with based on the position information and the flight state information of the plurality of aircrafts. If the positioning device has been cracked or interfered with, the position information outputted by the positioning device does not reflect a current true position of the UAV. When it is determined based on the flight state information that the position information outputted by the positioning device does not reflect the current true position of the UAV, the operation state of the positioning device is determined to be abnormal, or more specifically, the positioning device is determined to have been cracked or interfered with.

An order of performing S601 and S602 is not limited by the present disclosure. S601 and S602 may be performed sequentially or concurrently.

In the embodiments of the present disclosure, the control terminal obtains the position information outputted by the positioning device and the flight state information of the plurality of aircrafts detected by the aircraft detection device and detects the operation state of the positioning device based on the position information and the flight state information of the plurality of aircrafts. As such, the control terminal determines whether the positioning device of the UAV has been cracked or interfered with based on the flight state information of the plurality of aircrafts detected by the aircraft detection device and the position information outputted by the positioning device. If the positioning device has not been cracked or interfered with, the control terminal determines the flight state information of the UAV based on the position information outputted by the positioning device. For example, when the UAV is flying within the flight restrictions zones, the control terminal may limit the flight speed or the flight altitude of the UAV. Because the position information outputted by the positioning device is not trustworthy, the control terminal may control the flight state of the UAV to prevent the UAV from entering the flight restriction zones. Thus, in the embodiments of the present disclosure, the control terminal adjusts the flight state of the UAV based on the operation state of the positioning device, thereby ensuring the flight safety of the UAV and the surrounding aircrafts.

Figure 7:
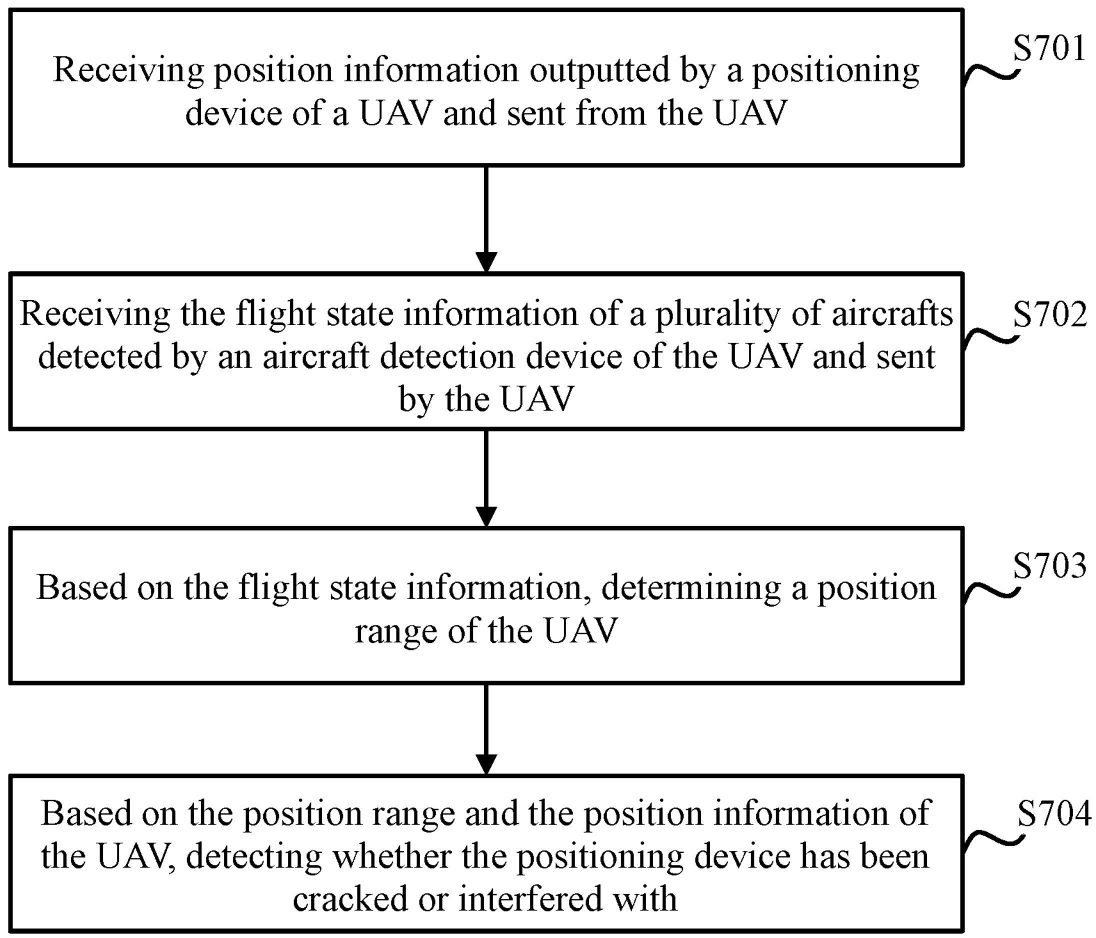
FIG. 7 is a flowchart of a method for detecting the operation state of the positioning device of the UAV according to another example embodiment of the present disclosure.

FIG. 7 is a flowchart of a method for detecting the operation state of the positioning device of the UAV according to another example embodiment of the present disclosure. The method may be applied to a control terminal of the UAV. The method shown in FIG. 7 includes the following.

At S701, position information outputted by a positioning device of a UAV and sent from the UAV is received.

S701 and S601 share same or similar operation principle. For detailed description of S701, reference may be made to the same for S601 in FIG. 6, and hence details thereof will not be described again.

At S702, receiving the flight state information of a plurality of aircrafts detected by an aircraft detection device of the UAV and sent by the UAV is received.

S702 and S602 share same or similar operation principle. For detailed description of S702, reference may be made to the same for S602 in FIG. 6, and hence details thereof will not be described again.

At S703, a position range of the UAV is determined based on the flight state information.

Specifically, after the flight state information of the plurality of aircrafts is obtained, the position range of the UAV may be determined based on the flight state information. That is, the flight state information is used to determine an approximate position range of the UAV. The position range is an expected position range, for example, a range of the position information outputted by the positioning device of the UAV in a normal operation state, or a range of the position information configured by the user.

Figure 8:
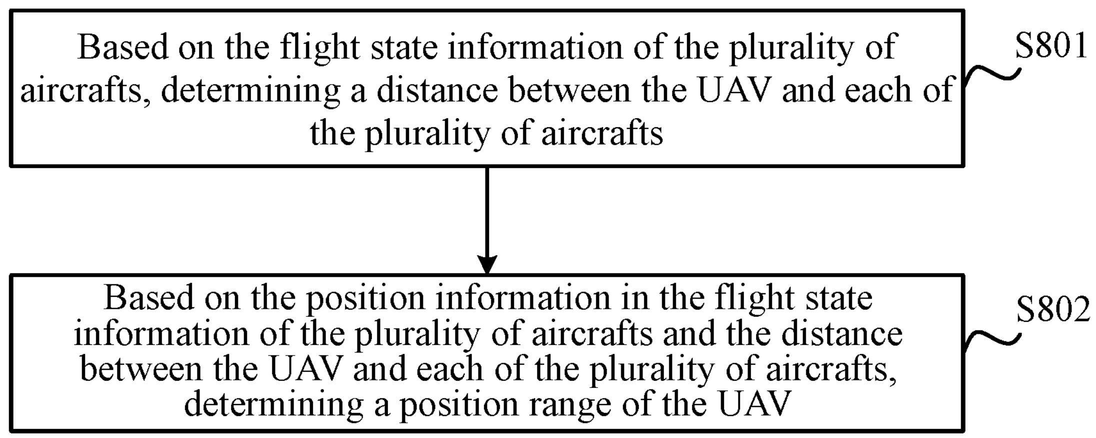
FIG. 8 is a flowchart of determining the position information of the UAV based on the flight state information according to another example embodiment of the present disclosure.

In some embodiments, determining the position range of the UAV based on the flight state information includes the following process, as shown in FIG. 8.

At S801, a distance between the UAV and each of the plurality of aircrafts is determined based on the flight state information of the plurality of aircrafts.

At S802, a position range of the UAV is determined based on the position information in the flight state information of the plurality of aircrafts and the distance between the UAV and each of the plurality of aircrafts.

In some embodiments, determining the distance between the UAV and each of the plurality of aircrafts based on the flight state information of the plurality of aircrafts (S801) includes: determining a quantity of the flight state information of each of the plurality of aircrafts received within a pre-set time interval and determining the distance between the UAV and each of the plurality of aircrafts based on the quantity of the flight state information of each of the plurality of aircrafts.

Specifically, the quantity of the flight state information of each of the plurality of aircrafts received by the aircraft detection device within the pre-set time interval is determined. Because the distance between the UAV and each of the plurality of aircrafts varies, the aircraft detection device of the UAV may receive different quantities of the flight state information for different ones of the plurality of aircrafts. That is, the distance between the UAV and each of the plurality of aircrafts and the quantity of the flight state information of each of the plurality of aircrafts that the aircraft detection device can receive are strongly correlated. Within the pre-set time interval, the greater the quantity of the received flight state information, the shorter the distance between the UAV and the corresponding aircraft. That is, the distance between the UAV and each of the plurality of aircrafts may be determined based on the quantity of the flight state information of each of the plurality of aircrafts received by the aircraft detection device within the pre-set time interval.

In some embodiments, determining the distance between the UAV and each of the plurality of aircrafts based on the flight state information of the plurality of aircrafts (S801) also includes the following process. Based on the quantity data of the flight state information of each of the plurality of aircrafts and a broadcast frequency of the flight state information broadcasted by a broadcast device of the corresponding aircraft, the distance between the UAV and each of the plurality of aircrafts is determined. Specifically, for detailed description, reference may be made to the related part previously described and hence the details there of not be described again.

In some embodiments, determining the position range of the UAV based on the position information in the flight state information of each of the plurality of aircrafts and the distance between the UAV and each of the plurality of aircrafts may include: determining a plurality of zones corresponding to the plurality of aircrafts, respectively, based on the position information in the flight state information of each of the plurality of aircrafts and the distance between the UAV and each of the plurality of aircrafts, and determining an overlapping area of the zones of the plurality of aircrafts as the position range of the UAV.

Specifically, the zone corresponding to an aircraft is determined based on the position information in the flight state information of the aircraft and the distance between the UAV and the aircraft. That is, with respect to a particular aircraft, the UAV is possibly located in the zone for the particular aircraft. After the zone for each of the plurality of aircrafts is determined, the overlapping area of the zones of the plurality of aircrafts may be determined. With respect to the plurality of aircrafts at the same time, the UAV may be located in the overlapping area and the overlapping area is determined to be the position range of the UAV.

The above implementation for determining the overlapping area is intended to be illustrative. Those skilled in the art may use other methods to determine the overlapping area based on the three spheres, which are not limited by the present disclosure.

Referring again to FIG. 7, at S704, whether the positioning device has been cracked or interfered with is detected based on the position range and the position information of the UAV.

Specifically, after the position range of the UAV is obtained, whether the position information outputted by the positioning device of the UAV is located within the position range is determined. If the position information outputted by the positioning device of the UAV is located within the position range, the positioning device operates normally. If the position information outputted by the positioning device of the UAV is located outside the position range, the positioning device has been cracked or interfered with.

Figure 9:
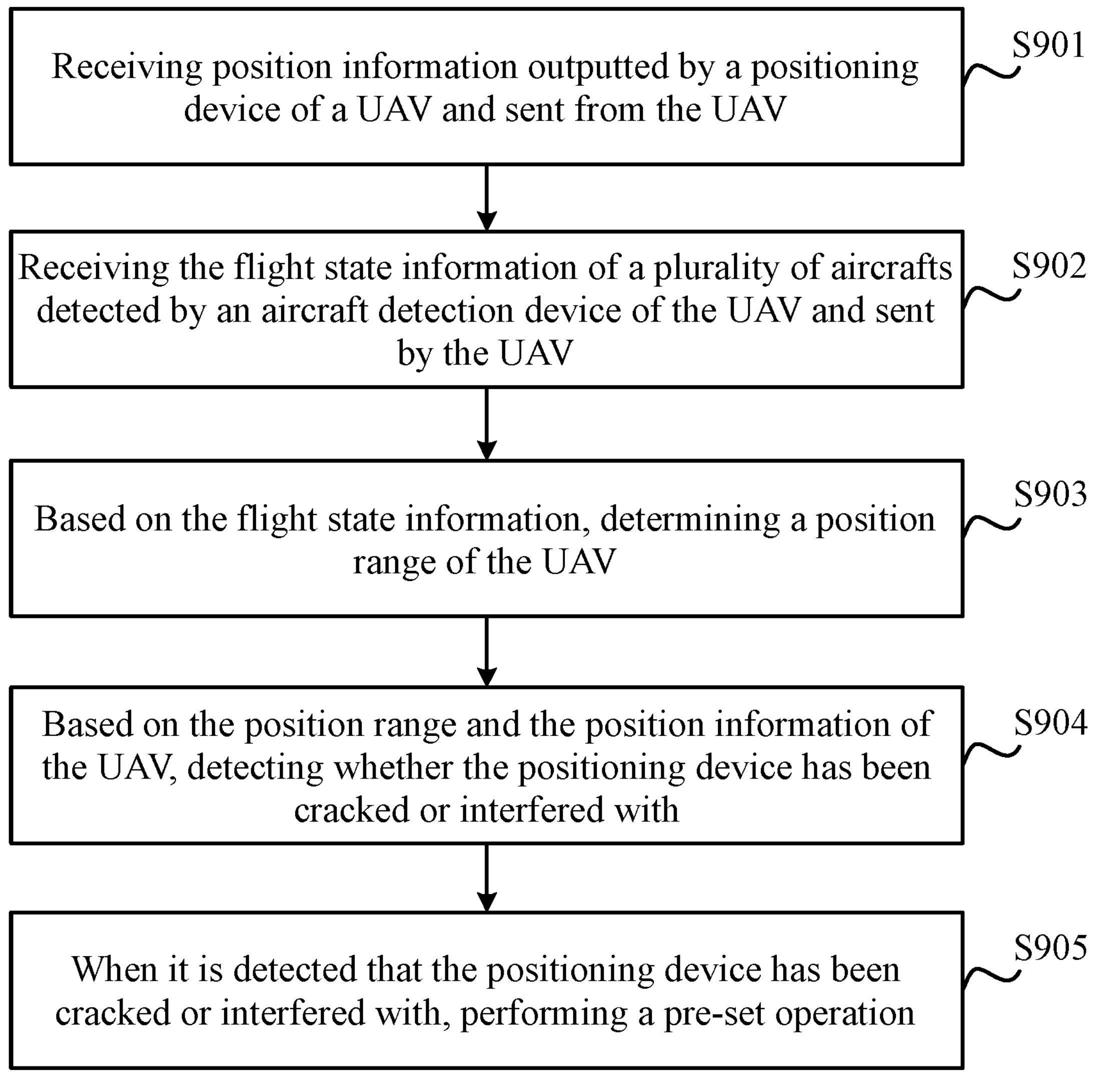
FIG. 9 is a flowchart of a method for detecting the operation state of the positioning device of the UAV according to another example embodiment of the present disclosure.

FIG. 9 is a flowchart of a method for detecting the operation state of the positioning device of the UAV according to another example embodiment of the present disclosure. The method may be applied to a control terminal of the UAV. The method shown in FIG. 9 includes the following.

At S901: position information outputted by a positioning device of a UAV and sent from the UAV is received.

S901 and S601 share same or similar operation principle. For detailed description of S901, reference may be made to the same for S601 in FIG. 6, and hence details thereof will not be described again.

At S902, the flight state information of a plurality of aircrafts detected by an aircraft detection device of the UAV and sent by the UAV is received.

S902 and S602 share same or similar operation principle. For detailed description of S902, reference may be made to the same for S602 in FIG. 6, and hence details thereof will not be described again.

At S903, a position range of the UAV is determined based on the flight state information.

S903 and S703 share same or similar operation principle. For detailed description of S903, reference may be made to the same for S703 in FIG. 7, and hence details thereof will not be described again.

At S904, whether the positioning device has been cracked or interfered with is detected based on the position range and the position information of the UAV.

S904 and S704 share same or similar operation principle. For detailed description of S904, reference may be made to the same for S704 in FIG. 7, and hence details thereof will not be described again.

At S905, a pre-set operation is performed if it is detected that the positioning device has been cracked or interfered with.

Specifically, when it is detected that the positioning device has been cracked or interfered with, the pre-set operation may be performed in one of the following manners.

In one embodiment, when it is detected that the positioning device has been cracked or interfered with, a notification message is sent to a control terminal.

In another embodiment, when it is detected that the positioning device has been cracked or interfered with, the flight of the UAV is restricted.

For example, restricting the flight of the UAV may include restricting one or more of flight time, flight distance, or flight altitude of the UAV, or may include controlling the UAV to return.

Figure 10:
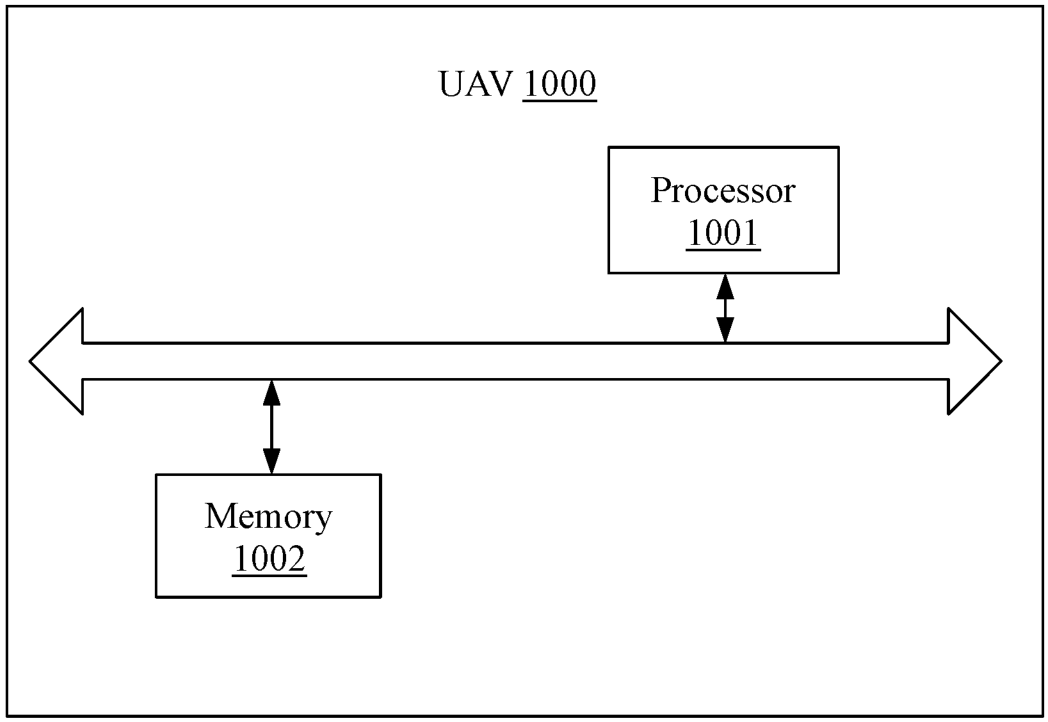
FIG. 10 is a schematic view of the UAV according to an example embodiment of the present disclosure.

The present disclosure also provides a UAV. FIG. 10 is a schematic block diagram of a UAV 100 according to an example embodiment of the present disclosure. As shown in FIG. 10, the UAV 1000 includes a processor 1001 and a memory 1002. The memory 1002 stores program instructions. The processor 1001 executes the program instructions stored in the memory 1002. When the program instructions are executed by the processor 1001, the instructions cause the processor 1001 to obtain position information outputted by a positioning device of the UAV, obtain flight state information of a plurality of aircrafts detected by an aircraft detection device of the UAV, and detect an operation state of the positioning device based on the position information and the flight state information.

In some embodiments, to detect the operation state of the positioning device based on the position information and the flight state information, the processor 1001 can detect whether the positioning device has been cracked or interfered with based on the position range and the position information.

In some embodiments, the aircraft detection device may be an ADS-B device.

In some embodiments, the flight state information may include one or more of position information, altitude information, speed information, flight route information, and flight identifier of the aircraft.

In some embodiments, to detect whether the positioning device has been cracked or interfered with based on the position range and the position information, the processor 1001 can determine a position range of the UAV based on the flight state information, and detect whether the positioning device has been cracked or interfered with based on the position range and the position information of the UAV.

In some embodiments, to determine the position range of the UAV based on the flight state information, the processor 1001 can determine the position range of the UAV based on the flight state information of the plurality of aircrafts.

In some embodiments, to detect whether the positioning device has been cracked or interfered with based on the position range and the position information of the UAV, the processor 1001 can determine that the positioning device has been cracked or interfered with when the position information is located outside the position range.

In some embodiments, to determine the position range of the UAV based on the flight state information of the plurality of aircrafts, the processor 1001 can determine a distance between the UAV and each of the plurality of aircrafts based on the flight state information of the plurality of aircrafts, and determine the position range of the UAV based on the position information in the flight state information of the plurality of aircrafts and the distance between the UAV and each of the plurality of aircrafts.

In some embodiments, to determine the position range of the UAV based on the position information in the flight state information of the plurality of aircrafts and the distance between the UAV and each of the plurality of aircrafts, the processor 1001 can obtain a receiving signal strength of the flight state information of each of the plurality of aircrafts, and determine the distance between the UAV and the corresponding aircraft based on the receiving signal strength.

In some embodiments, to determine the distance between the UAV and each of the plurality of aircrafts based on the flight state information of the plurality of aircrafts, the processor 1001 can, for each of the plurality of aircrafts, determine a quantity of the flight state information detected by the aircraft detection device of the UAV within a pre-set time interval, and, based on the quantity of the flight state information of each of the plurality of aircrafts, determine the distance between the UAV and each of the plurality of aircrafts.

In some embodiments, to determine the distance between the UAV and each of the plurality of aircrafts based on the flight state information of the plurality of aircrafts, the processor 1001 can, for each of the plurality of aircrafts, determine the distance between the UAV and each of the plurality of aircrafts based on the quantity data of the flight state information of each of the plurality of aircrafts and a broadcast frequency of the flight state information broadcasted by a broadcast device of the corresponding aircraft.

In some embodiments, to determine the position range of the UAV based on the position information in the flight state information of the plurality of aircrafts and the distance between the UAV and each of the plurality of aircrafts, the processor 1001 can determine a plurality of zones corresponding to the plurality of aircrafts, respectively, based on the position information in the flight state information of each of the plurality of aircrafts and the distance between the UAV and each of the plurality of aircrafts, and determine an overlapping area of the zones of the plurality of aircrafts as the position range of the UAV.

In some embodiments, the processor 1001 can perform a pre-set operation when it is detected that the positioning device has been cracked or interfered with.

In some embodiments, to perform the pre-set operation, the processor 1001 can send a notification message to a control terminal.

In some embodiments, to perform the pre-set operation, the processor 1001 can restrict the flight of the UAV.

In some embodiments, to perform the pre-set operation, the processor 1001 can restrict one or more of flight time, flight distance, or flight altitude of the UAV.

In some embodiments, to perform the pre-set operation, the processor 1001 can control the UAV to return.

Figure 11:
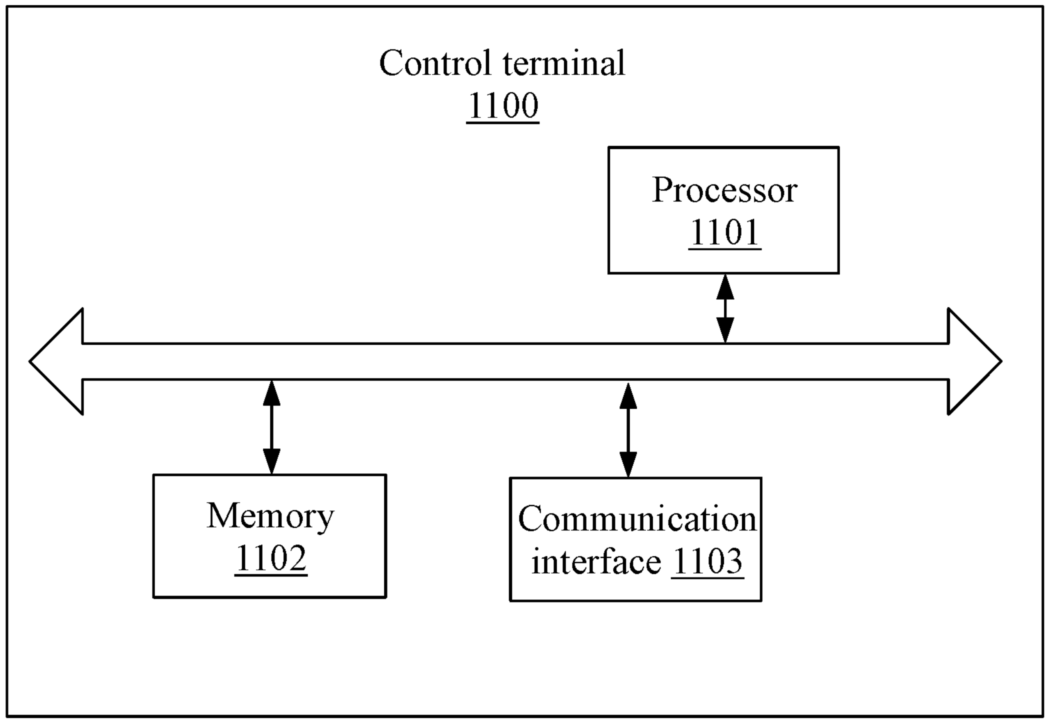
FIG. 11 is a schematic view of a control terminal according to an example embodiment of the present disclosure.

The present disclosure also provides a control terminal. FIG. 11 is a schematic view of a control terminal 1100 according to an example embodiment of the present disclosure. As shown in FIG. 11, the control terminal 1100 includes a processor 1101, a memory 1102, and a communication interface 1103. The memory 1102 stores program instructions. The communication interface 1103 receives position information outputted by a positioning device of a UAV and sent by the UAV, and flight state information of a plurality of aircrafts outputted by an aircraft detection device of the UAV and sent by the UAV. The processor 1101 executes the program instructions stored in the memory 1102 to detect an operation state of the positioning device based on the position information and the flight state information.

In some embodiments, to detect the operation state of the positioning device based on the position information and the flight state information, the processor 1101 can detect whether the positioning device of the UAV has been cracked or interfered with based on the position information and the flight state information.

In some embodiments, the aircraft detection device may be an ADS-B device.

In some embodiments, the flight state information includes one or more of position information, altitude information, speed information, flight route information, and flight identifier of the aircraft.

In some embodiments, to detect whether the positioning device has been cracked or interfered with based on the position information and the flight state information, the processor 1101 can determine a position range of the UAV based on the flight state information, and detect whether the positioning device has been cracked or interfered with based on the position range and the position information of the UAV.

In some embodiments, to determine the position range of the UAV based on the flight state information, the processor 1101 can determine the position range of the UAV based on the flight state information of the plurality of aircrafts.

In some embodiments, to detect whether the positioning device has been cracked or interfered with based on the position range and the position information of the UAV, the processor 1101 can determine whether the positioning device has been cracked or interfered with when the position information is located outside the position range.

In some embodiments, to determine the position range of the UAV based on the flight state information of the plurality of aircrafts, the processor 1101 can determine a distance between the UAV and each of the plurality of aircrafts based on the flight state information of the plurality of aircrafts, and determine the position range of the UAV based on the position information in the flight state information of the plurality of aircrafts and the distance between the UAV and each of the plurality of aircrafts.

In some embodiments, to determine the position range of the UAV based on the position information in the flight state information of the plurality of aircrafts and the distance between the UAV and each of the plurality of aircrafts, the processor 1101 can obtain a receiving signal strength of the flight state information of each of the plurality of aircrafts; and determine the distance between the UAV and the corresponding aircraft based on the receiving signal strength.

In some embodiments, to determine the distance between the UAV and each of the plurality of aircrafts based on the flight state information of the plurality of aircrafts, the processor 1101 can, for each of the plurality of aircrafts, determine a quantity of the flight state information detected by the aircraft detection device of the UAV within a pre-set time interval, and based on the quantity of the flight state information of each of the plurality of aircrafts, determine the distance between the UAV and each of the plurality of aircrafts.

In some embodiments, to determine the distance between the UAV and each of the plurality of aircrafts based on the flight state information of the plurality of aircrafts, the processor 1101 can, for each of the plurality of aircrafts, determine the distance between the UAV and each of the plurality of aircrafts based on the quantity data of the flight state information of each of the plurality of aircrafts and a broadcast frequency of the flight state information broadcasted by a broadcast device of the corresponding aircraft.

In some embodiments, to determine the position range of the UAV based on the position information in the flight state information of the plurality of aircrafts and the distance between the UAV and each of the plurality of aircrafts, the processor 1101 can determine a plurality of zones corresponding to the plurality of aircrafts, respectively, based on the position information in the flight state information of each of the plurality of aircrafts and the distance between the UAV and each of the plurality of aircrafts, and determine an overlapping area of the zones of the plurality of aircrafts as the position range of the UAV.

In some embodiments, the processor 1101 can perform a pre-set operation when it is detected that the positioning device has been cracked or interfered with.

In some embodiments, to perform the pre-set operation, the processor 1101 can send a notification message to a control terminal.

In some embodiments, to perform the pre-set operation, the processor 1101 can restrict the flight of the UAV.

In some embodiments, to perform the pre-set operation, the processor 1101 can restrict one or more of flight time, flight distance, or flight altitude of the UAV.

In some embodiments, to perform the pre-set operation, the processor 1101 can control the UAV to return.

In the embodiments of the present disclosure, the disclosed system, device, and method may be implemented in other manners. For example, the device embodiments are merely illustrative. For example, the division of the units is only a logic function division. Other divisions may be possible in actual implementation. For example, a plurality of units or components may be combined or integrated to a different system. Some features may be omitted or may not be executed. Further, mutual coupling or direct coupling or communication connection as shown in the drawings or discussed in the description may be indirect coupling or communication connection through certain interfaces, devices, or units, and may be electrical, mechanical, or in other forms.

Units described as separate parts may or may not be physically separated. Components shown as units may or may not be physical units, that is, may be located in one place, or may be distributed to a plurality of network units. Some or all units may be selected according to actual requirements to achieve the objectives of the solution of the present disclosure.

In addition, various functional blocks of the embodiments of the present disclosure may be integrated into one processing module or circuit, or may be physically separate modules or circuits, or may have two or more functional blocks integrated into one module or circuit. The integrated module or circuit may be implemented in hardware or may be implemented in software functional modules. When being implemented in software functional modules and sold or used as an independent product, the integrated module may be stored in the computer readable storage medium.

The integrated circuits implemented in the software function modules may be stored in a computer-readable storage medium. The software function modules stored in the storage medium includes a plurality of instructions that cause a computer device (a personal computer, a server, or a network device) or a processor to perform some or all processes disclosed in the method embodiments. The storage medium includes any medium capable of storing program instructions, such as a USB disk, a portable hard drive, a read-only memory (ROM), a random-access memory (RAM), a magnetic disk, or an optical disk.

Those skilled in the art understand that for the convenience and brevity of the description, the division of the function modules are intended to be illustrative. In practical applications, the function assignments may be completed by different function modules as needed. That is, the internal structure of the device may be divided into different function modules to implement some or all described functions. The detail operation of the described device may be referred to the corresponding process in the foregoing method embodiments and may not be repeated herein.

The foregoing descriptions are merely some implementation manners of the present disclosure, but the scope of the present disclosure is not limited thereto. Without departing from the spirit and principles of the present disclosure, any modifications, equivalent substitutions, and improvements, etc. shall fall within the scope of the present disclosure. Thus, the scope of the invention should be determined by the appended claims.

What is claimed is:

1. A control terminal comprising:

a memory storing program instructions;

a communication interface configured to:

communicate with an unmanned aerial vehicle (UAV);

receive position information outputted by a positioning device of the UAV and sent by the UAV; and receive flight state information of a plurality of aerial crafts detected by aerial-craft detection device of the UAV and sent by the UAV; and a processor configured to execute the program instructions to detect an operation state of the positioning device based on the position information and the flight state information including:

determining a position range of the UAV based on the flight state information of the plurality of aerial crafts detected by the aerial-craft detection device of the UAV;

determining whether the position information outputted by the positioning device of the UAV is located outside the position range of the UAV determined based on the flight state information of the plurality of aerial crafts; and in response to the position information outputted by the positioning device locating outside the position range, determining that the positioning device has been hacked or interfered with.

2. The control terminal of claim 1, wherein the aerial-craft detection device includes an Automatic Dependent Surveillance-Broadcast (ADS-B) device.

3. The control terminal of claim 1, wherein the flight state information of one of the plurality of aerial crafts includes one or more of position information, altitude information, speed information, flight route information, and flight identifier of the one of the plurality of aerial crafts.

4. The control terminal of claim 1, wherein the processor is further configured to execute the program instructions to:

based on the flight state information of the plurality of aerial crafts, determine a distance between the UAV and each of the plurality of aerial crafts; and based on position information in the flight state information of the plurality of aerial crafts and the distance between the UAV and each of the plurality of aerial crafts, determine the position range of the UAV.

5. The control terminal of claim 4, wherein the processor is further configured to execute the program instructions to, for each of the plurality of aerial crafts:

obtain a receiving signal strength of the flight state information of the corresponding aerial craft; and based on the receiving signal strength, determine the distance between the UAV and the corresponding aerial craft.

6. The control terminal of claim 4, wherein the processor is further configured to execute the program instructions to, for each of the plurality of aerial crafts:

determine a quantity of the flight state information of the corresponding aerial-craft detected by the aerial-craft detection device within a pre-set time interval; and based on the quantity of the flight state information of the corresponding aerial craft, determine the distance between the UAV and the corresponding aerial craft.

7. The control terminal of claim 4, wherein the processor is further configured to execute the program instructions to, for each of the plurality of aerial crafts, determine the distance between the UAV and the corresponding aerial craft based on quantity data of the flight state information of the corresponding aerial craft and a broadcast frequency of the flight state information broadcasted by a broadcast device of the corresponding aerial craft.

8. The control terminal of claim 4, wherein the processor is further configured to execute the program instructions to:

based on the position information in the flight state information of each of the plurality of aerial crafts and the distance between the UAV and each of the plurality of aerial crafts, determine a plurality of zones corresponding to the plurality of aerial crafts, respectively; and determine an overlapping area of the zones as the position range of the UAV.

9. The control terminal of claim 1, wherein the processor is configured to execute the program instructions to perform a pre-set operation in response to detecting that the positioning device has been hacked or interfered with.

10. The control terminal of claim 9, wherein the pre-set operation includes displaying a notification message.

11. The control terminal of claim 9, wherein the pre-set operation includes restricting flight of the UAV.

12. The control terminal of claim 11, wherein restricting the flight of the UAV includes restricting one or more of flight time, flight distance, and flight altitude of the UAV.

13. The control terminal of claim 11, wherein restricting the flight of the UAV includes controlling the UAV to return.

14. An unmanned aerial vehicle (UAV) comprising:

a memory storing program instructions; and a processor configured to execute the program instructions to:

obtain position information outputted by a positioning device of the UAV;

obtain flight state information of a plurality of aerial crafts detected by an aerial-craft detection device of the UAV; and based on the position information and the flight state information, detect an operation state of the positioning device; including:

determining a position range of the UAV based on the flight state information of the plurality of aerial crafts detected by the aerial-craft detection device of the UAV;

determining whether the position information outputted by the positioning device of the UAV is located outside the position range of the UAV determined based on the flight state information of the plurality of aerial crafts; and in response to the position information outputted by the positioning device locating outside the position range, determining that the positioning device has been hacked or interfered with.

15. The UAV of claim 14, wherein the aerial-craft detection device includes an Automatic Dependent Surveillance-Broadcast (ADS-B) device.

16. A method comprising:

obtaining position information outputted by a positioning device of an unmanned aerial vehicle (UAV);

obtaining flight state information of a plurality of aerial crafts detected by an aerial-craft detection device of the UAV; and detecting, based on the position information and the flight state information, an operation state of the positioning device, including:

determining a position range of the UAV based on the flight state information of the plurality of aerial crafts detected by the aerial-craft detection device of the UAV;

determining whether the position information outputted by the positioning device of the UAV is located outside the position range of the UAV determined based on the flight state information of the plurality of aerial crafts; and in response to the position information outputted by the positioning device locating outside the position range, determining that the positioning device has been hacked or interfered with.

17. The method of claim 16, wherein the aerial-craft detection device includes an Automatic Dependent Surveillance-Broadcast (ADS-B) device.

* * * * *